US011772494B2

(12) United States Patent
Quentin et al.

(10) Patent No.: US 11,772,494 B2
(45) Date of Patent: Oct. 3, 2023

(54) ELECTRIC SWITCHING DEVICE FOR A RAILWAY VEHICLE AND RAILWAY VEHICLE COMPRISING SUCH A DEVICE

(71) Applicant: ALSTOM Transport Technologies, Saint-Saintouen-sur-Seine (FR)

(72) Inventors: Nicolas Quentin, Ibos (FR); Laurent Duffau, Arcizac-Adour (FR); Aurel Gavid, Vic en Bigorre (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 553 days.

(21) Appl. No.: 16/803,850

(22) Filed: Feb. 27, 2020

(65) Prior Publication Data
US 2020/0269700 A1 Aug. 27, 2020

(30) Foreign Application Priority Data
Feb. 27, 2019 (FR) ...................................... 1902017

(51) Int. Cl.
*H01H 33/28* (2006.01)
*B60L 3/04* (2006.01)
(52) U.S. Cl.
CPC ............... *B60L 3/04* (2013.01); *H01H 33/28* (2013.01); *B60L 2200/26* (2013.01)
(58) Field of Classification Search
CPC ...... B60L 3/04; B60L 3/0092; B60L 2200/26; B60L 5/00; H01H 31/003; H01H 31/36;
(Continued)

(56) References Cited

U.S. PATENT DOCUMENTS 4,246,978 A * 1/1981 Schulz ..................... B60K 3/00
180/165
4,482,936 A * 11/1984 Saito .................... H02B 11/167
361/615
(Continued)

FOREIGN PATENT DOCUMENTS

CN 200972997 Y 11/2007
CN 202134840 U 2/2012
(Continued)

OTHER PUBLICATIONS

Secheron: "Multi-functional Main AC Switch for rolling stock Type MACS", 2016, pp. 1-8, XP055634139, Geneva, CH, URL:https://imtram.com/wp-content/uploads/Secheron-Brochure-MACS.pdf [Oct. 21, 2019].

(Continued)

*Primary Examiner* — William A Bolton
(74) *Attorney, Agent, or Firm* — Knobbe, Martens, Olson & Bear, LLP (57) ABSTRACT

This electric switching device (2) comprises a first module (4), including a first support (42) on which a circuit breaker (44) is mounted, and at least one second module (6), including a second support (62) on which an electric component (64) is mounted that is able to be associated with the circuit breaker. In particular in order to facilitate the maintenance of this switching device, the latter includes guiding means (81 and 82) that are able to guide the first and second supports relative to one another between a disassembled configuration, in which at least one of the first and second modules is disengageable from the guiding means independently of the other, and an assembled configuration, in which the circuit breaker and the electric component are in a relative connection position and are able to be electrically connected to or disconnected from one another.

13 Claims, 8 Drawing Sheets (58) Field of Classification Search
CPC ........ H01H 31/34; H01H 31/32; H01H 33/28; H01H 33/6661; H01H 33/6664; H01H 2231/026; H01H 89/00; B61C 17/00
USPC ......... 200/50.27, 50.28, 50.32, 50.34; 191/2, 191/38, 60, 64, 45 R, 50
See application file for complete search history.

(56) References Cited

U.S. PATENT DOCUMENTS

| | | | | |
|---|---|---|---|---|
| 6,371,265 | B1 * | 4/2002 | Arrouy | H01H 33/16 323/208 |
| 8,151,955 | B2 * | 4/2012 | Aubigny | B60L 3/00 191/2 |
| 9,352,653 | B2 * | 5/2016 | Kawasaki | B61G 5/10 |
| 9,656,553 | B2 * | 5/2017 | Baumann | B61C 17/00 |
| 2002/0066655 | A1 * | 6/2002 | Theaudiere | H01H 9/104 200/47 |
| 2002/0104827 | A1 | 8/2002 | Rokunohe et al. | |
| 2013/0048478 | A1 | 2/2013 | Lammers et al. | |
| 2013/0056341 | A1 | 3/2013 | Binnendijk et al. | |
| 2013/0187732 | A1 * | 7/2013 | Bullock | H01H 33/6662 335/6 |

FOREIGN PATENT DOCUMENTS

| | | |
|---|---|---|
| EP | 0582828 A1 | 2/1994 |
| EP | 2340958 A1 | 7/2011 |
| EP | 3301699 A1 | 4/2018 |
| FR | 2325532 A1 | 4/1977 |
| GB | 2175449 A | 11/1986 |

OTHER PUBLICATIONS

Schneider Electric: "Square D(TM) Brand Type VR Medium Voltage Vacuum Circuit Breaker", 2014, pp. 1-6, XP055634262, URL:https://download.schneider-electric.com/files?p_enDocType=Data+Bulletin&p_File_Name=6055DB1401.pdf&p_Doc_Ref=6055DB1401 [Oct. 21, 2019].
French Search Report for Application No. FR1902017, dated Oct. 22, 2019 in 2 pages.

* cited by examiner

ELECTRIC SWITCHING DEVICE FOR A RAILWAY VEHICLE AND RAILWAY VEHICLE COMPRISING SUCH A DEVICE

The invention relates to an electric switching device for a railway vehicle, as well as a railway vehicle including such a device.

The invention more specifically relates to switching devices that include at least two modules, including a first module with a circuit breaker mounted on a support and a second module with an electric component mounted on another support and that is able to be associated with the circuit breaker. The electric component of the second module can in particular be chosen from an earthing disconnector or a lightning arrester.

Such a device makes it possible to process the electric current supplied to a railway vehicle under safe conditions both in normal operation and during maintenance operations. During these maintenance operations, the electric switching device must be disassembled and removed from the railway vehicle in order to replace any defective or worn out parts.

It is known from GB-A-2,175,449 to make a modular electric switching device, including a first box, in which a vacuum circuit breaker is assembled, and a second box containing other electric components, in particular disconnectors. The second box is attached to the first box using screws or bolts. This box structure does not allow easy access to the circuit breaker or the other electric components during maintenance operations, and further requires disassembling the various boxes in case of replacement of one of the electric components or the circuit breaker.

EP-3,301,699-A1 discloses a switching device of a ground facility, in which circuit breakers are assembled on a first support, which is movable owing to guiding means. The circuit breakers are electrically connected to other electric components when the first moving support is in an assembled configuration. The first support must be moved completely to be able to disconnect the circuit breakers from the other electric components. This disconnection operation, which must for example be done during inspection or maintenance visits, is a relatively cumbersome operation to perform, and is time-consuming. The moving support further has a bulky structure.

The invention more particularly aims to resolve these issues by proposing a new electric switching device for a railway vehicle, with easier maintenance.

To that end, the invention relates to an electric switching device for a railway vehicle, comprising:
- a first module including a first support on which a circuit breaker is mounted
- at least one second module including a second support, which is separate from the first support and on which an electric component is mounted that is able to be associated with the circuit breaker, and
- guiding means that are able to guide the first and second supports relative to one another between a disassembled configuration, in which at least one of the first and second modules is disengageable from the guiding means independently of the other, and an assembled configuration, in which the circuit breaker and the electric component are able to be connected to one another.

According to the invention, in the assembled configuration, the circuit breaker and the electric component are in a relative connection position and are able to be electrically connected or disconnected.

Owing to the invention, the electric switching device has a modular structure that allows easy transport, assembly and disassembly of the first and second modules.

According to further aspects of the invention, which are advantageous but not compulsory, the electric switching device might incorporate one or several of the following features:
- the guiding means are configured to guide in translation, along an axis, the first and second supports between their assembled configuration and their disassembled configuration;
- the guiding means are arranged in the first and second supports, the guiding means comprising complementary shapes configured to guide in translation the first and second supports between their assembled configuration and their disassembled configuration;
- the first and second supports include mechanical assembly means that are configured to reversibly assemble the first and second supports to one another in the assembled configuration;
- the assembly means comprise a first part borne by the first support and a second part borne by the second support, the first and second parts cooperating by shape complementarity when the first and second supports are in the assembled configuration;
- one of the first and second parts of the assembly means is a male element, and the other of the first and second parts of the assembly means is a female element, and the male element penetrates the female element when the first and second supports go from the disassembled configuration to the assembled configuration;
- the device includes fastening means configured to fasten the first and second supports reversibly to the guiding means when the first and second supports are in the assembled configuration;
- the first support is a plate having a first face on which the circuit breaker is mounted and a second face, which is opposite the first face of the plate of the first support and on which a control member is mounted to control the circuit breaker, and the second support is a plate having a first face on which the electric component is mounted and a second face, which is opposite the first face of the plate of the second support and on which the control member is mounted to control the electric component, and the first face of the plate of the first support and the first face of the plate of the second support face the same side when the first and second supports are in the assembled configuration;
- the first face of the plate of the first support and the first face of the plate of the second support are flush when the first and second supports are in the assembled configuration;
- the circuit breaker includes a first connection member, the electric component includes a second connection member, and the first and second connection members are able to be electrically connected to one another when the first and second supports are in the assembled configuration; and
- the first and second connection members connect to one another under the action of at least one of the control members when the first and second supports are in the assembled configuration.

The invention also relates to a railway vehicle, including:
an aisle,
a high-voltage box, accessible via the aisle, and
an electric switching device, which is as defined above and which is installed in the high-voltage box when the first and second supports are in the assembled configuration, at least one of the first and second modules of the device being dimensioned to be moved in the aisle when the first and second supports are in the disassembled configuration.

The railway vehicle offers easier maintenance of the electric switching device.

The invention will be better understood and other advantages thereof will appear more clearly in light of the following description of two embodiments of an electric switching device for a railway vehicle and a railway vehicle including an electric switching device according to the principle of the invention. The disclosure is provided solely as an example and is done in reference to the drawings, in which:

Figure 1:
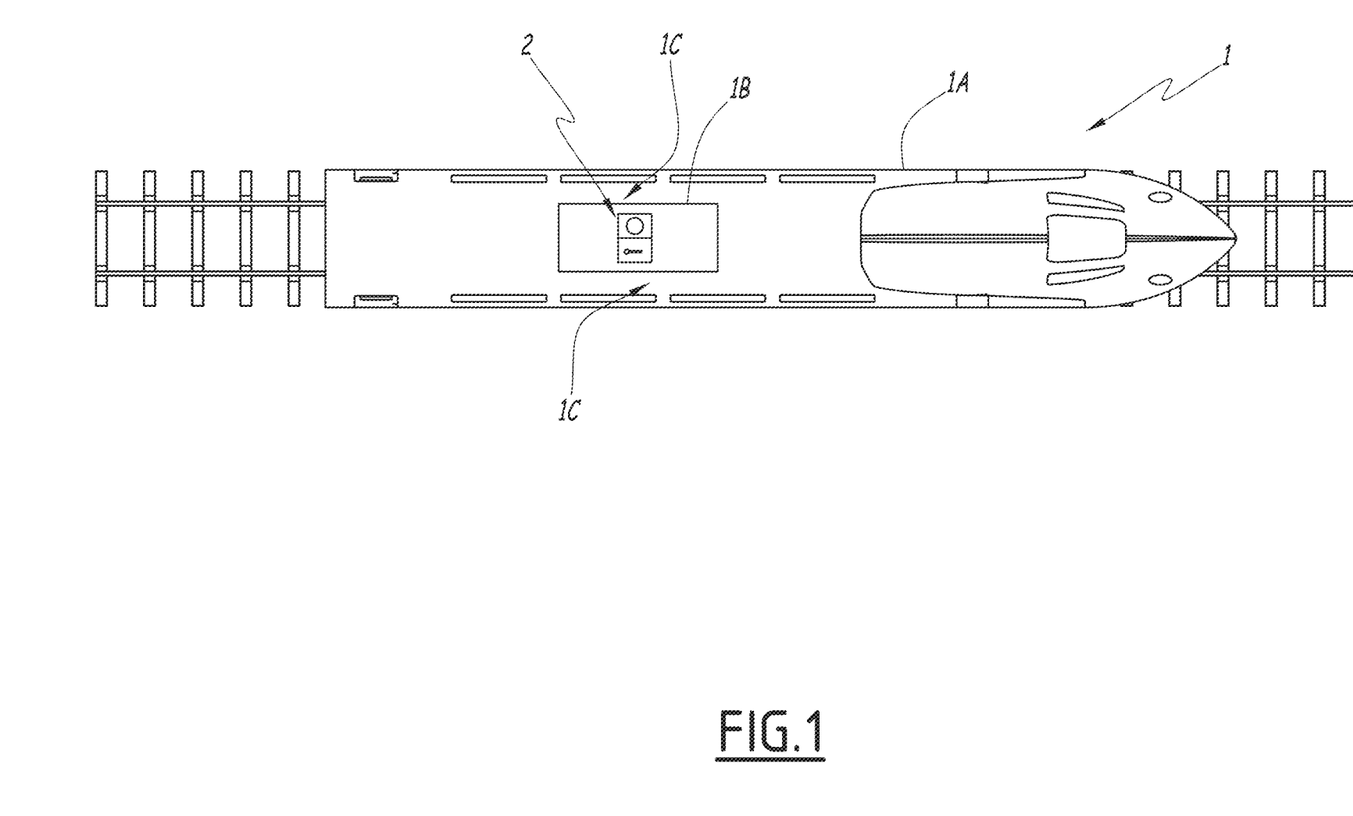
FIG. 1 is a diagram of a railway vehicle according to the invention.

FIG. 1 shows a railway vehicle 1. The railway vehicle 1 includes an outer body 1A provided to roll on rails of a railway network. The embodiment of the outer body 1A is not limiting.

The railway vehicle 1 also includes a high-voltage box 1B that is arranged and fastened inside the outer body 1A. The high-voltage box 1B is provided to receive various electrical and electromechanical equipment items, in particular to supply electricity to and for the traction of the railway vehicle. The railway vehicle 1 also includes one or several aisles 1C. In FIG. 1, two such side aisles are thus shown. Each of the aisles 10 is arranged inside the outer body 1A, while being arranged between the outer side wall of the latter and the high-voltage box 1B in the case of a side aisle, or between two inner boxes in the case of a central aisle. Each aisle 10 allows an operator, such as a maintenance agent, to access the high-voltage box 1B from inside the outer body 1A. Here again, the embodiment of the aisle(s) 10 is not limiting.

The railway vehicle 1 also includes an electric switching device 2, which is only shown schematically in FIG. 1 and which is shown in detail in FIGS. 2 to 6. For convenience, the remainder of the disclosure is done in reference to an orthonormal coordinate system, which is made up of axes X, Y and Z and which is indicated in FIGS. 2 to 6. In practice, this orthonormal coordinate system is fixedly connected to the outer body 1A.

The electric switching device 2 is housed in the high-voltage box 1B of the vehicle 1. In other words, the switching device 2 is said to be "embedded" in the railway vehicle 1. The available space within the box 1B being reduced, in particular compared with a stationary facility such as an electric transformation unit on the edge of a railway track, the switching device 2 has a compact and modular structure, so as to be easily movable in the aisles 10 by an operator during maintenance operations, as explained later.

The electric switching device 2 includes a first module 4. As clearly shown in FIGS. 2 and 3, the module 4 includes a support 42 that includes, or consists of, a plate 43. The plate 43 is rigid, in particular made from metal. During use, that is to say, during normal implementation of the switching device 2, the plate 43 extends globally in a geometric plane that is orthogonal to the axis Z. Thus, the plate 43 has two main faces, namely a face 43A and a face 43B, which are opposite one another along the axis Z. These faces 43A and 43B are preferably planar and are machined so as to accommodate the various elements necessary for the fastening and operation of the switching device 2.

Figure 6:
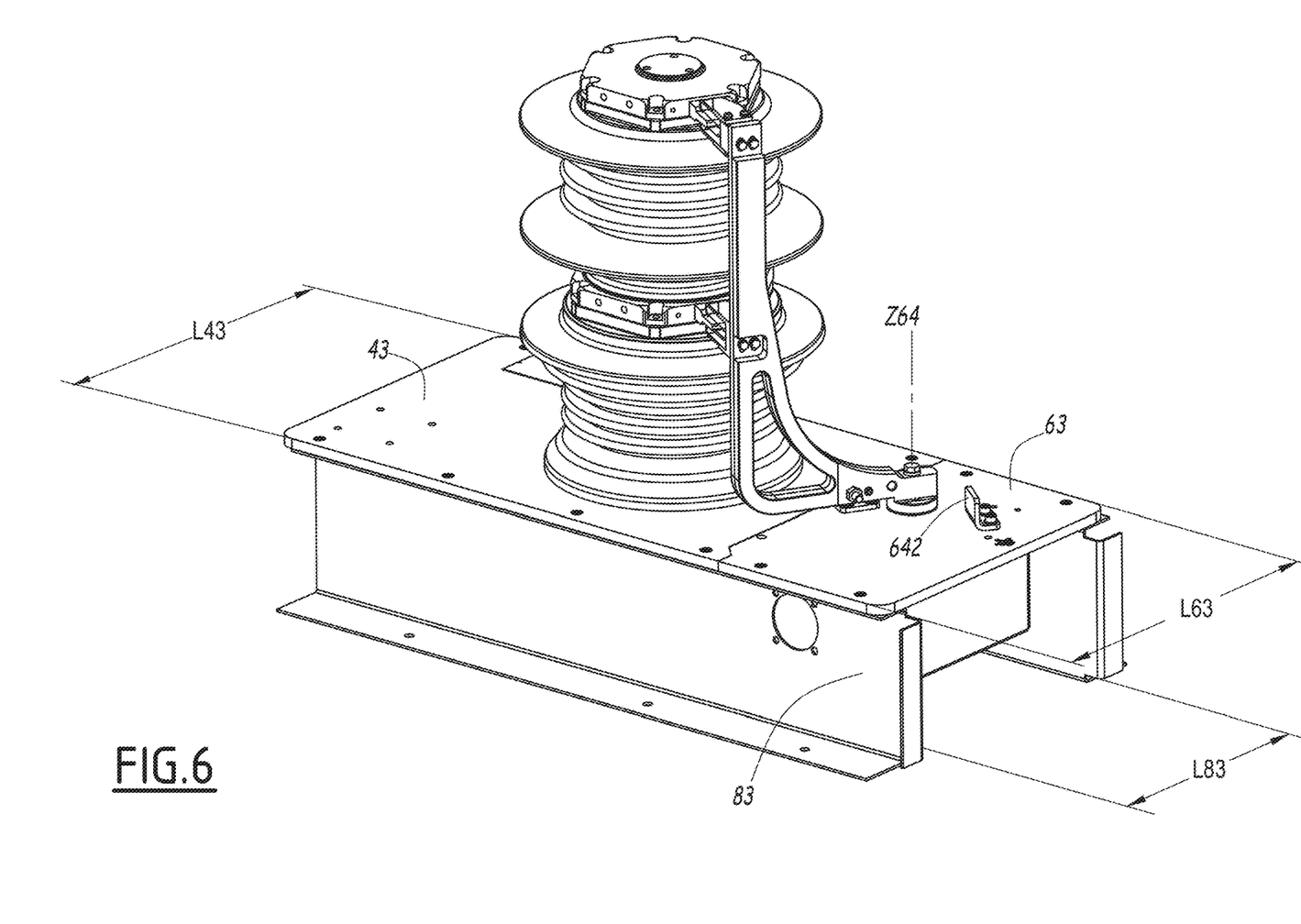
FIG. 6 is a view similar to FIG. 5, illustrating another state of the assembled configuration.

The plate 43 includes two side edges that are opposite one another along the axis Y. In FIG. 6, reference L43 denotes the dimension of the plate 43, along the axis Y, separating the two side edges from one another. Each of these side edges is provided with through holes 431, each of these holes 431 coupling the faces 43A and 43B to one another. In the exemplary embodiment considered in the figures, the holes 431 are substantially evenly distributed along each of the side edges. Additionally, each of the side edges is provided, on the face 43B of the plate 43, with a rim 432, more specifically visible in FIG. 4.

Additionally, the plate 43 includes two front edges that are opposite one another along the axis X. As visible in FIGS. 2 to 4, one of these front edges is provided with a housing 433 that has a bottom 433A extending transversely to the axis X. The housing 433 also has side faces 433B, which are opposite one another along the axis Y and which extend from the bottom 433A converging toward one another toward the opposite front edge. Thus, the mouth of the housing 433 extends, along the axis Y, over a larger expanse than the bottom 433A of the housing 433. The housing 433 is provided with holes 434 that emerge at least on the face 43A of the plate 43.

The module 4 also includes a circuit breaker 44, for example a vacuum circuit breaker. As clearly shown in FIGS. 2 and 3, the circuit breaker 44 is mounted securely on the face 43A of the plate 43. The circuit breaker 44 is provided with blades 441 corresponding to electric contacts.

The module 4 further includes a control member 46 that is arranged on the face 43B of the plate 43. This control member 46 is designed to control the circuit breaker 44 in a manner known in itself. Irrespective of its embodiment, the control member 46 has a dimension along the axis Y that is denoted L46 in FIG. 2.

The switching device 2 further includes a second module 6. As clearly shown in FIGS. 2 and 3, the second module 6 includes a support 62 that includes, or consists of, a plate 63. The plate 63 is rigid, for example made from metal. During use, that is to say, during normal implementation of the switching device 2, the plate 63 extends globally in a geometric plane that is orthogonal to the axis Z. Thus, the plate 63 has two main faces, namely a face 63A and a face 63B, which are opposite one another along the axis Z. These faces 63A and 63B are preferably planar and are machined so as to accommodate the various elements necessary for the fastening and operation of the switching device 2.

Figure 2:
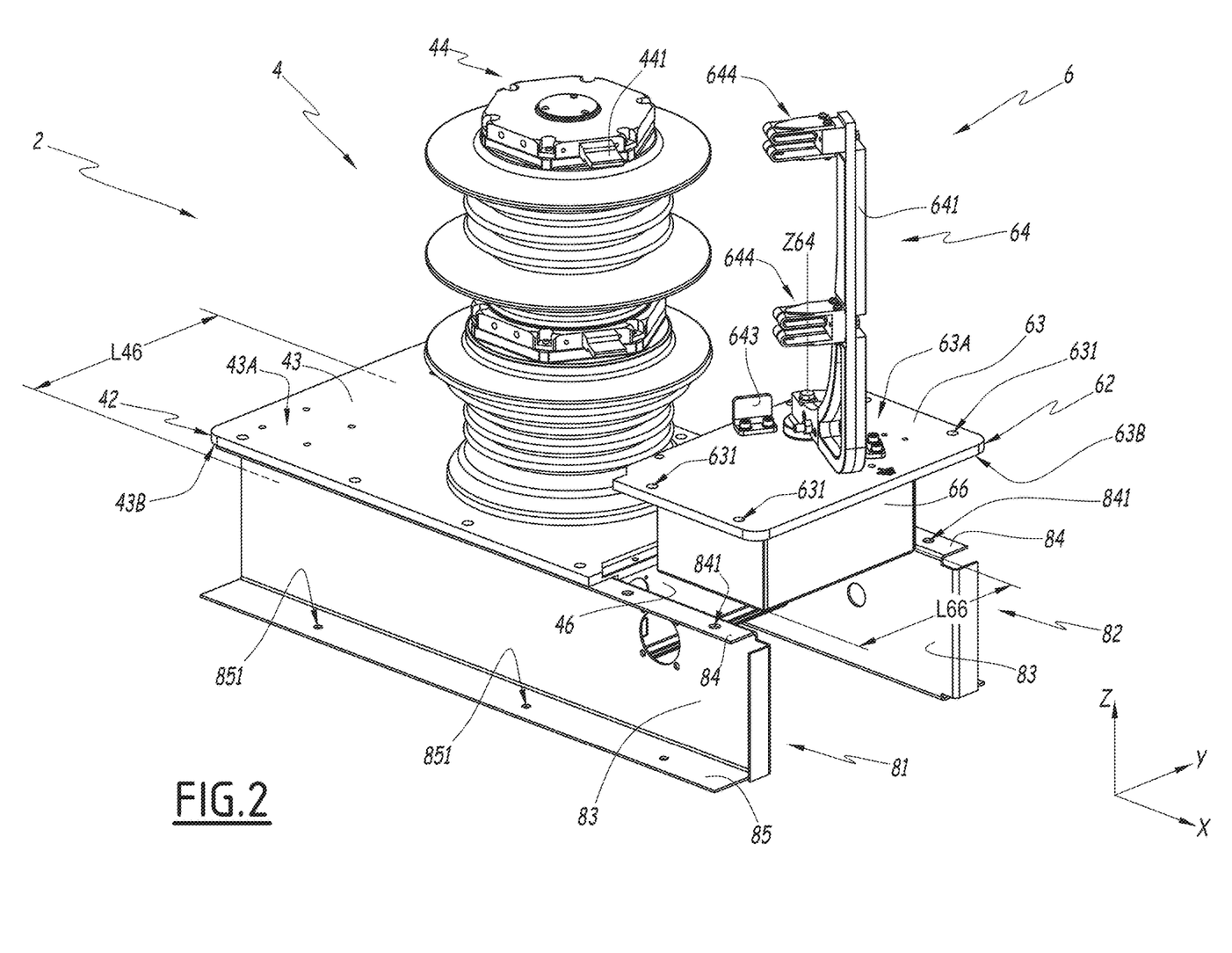
FIG. 2 is a perspective view of an electric switching device according to a first embodiment of the invention, in a disassembled configuration.

The plate 63 includes two side edges that are opposite one another along the axis Y. In FIG. 2 and FIG. 6, reference L63 denotes the dimension of the plate 63, along the axis Y, separating the two side edges from one another.

Each of these side edges is provided with through holes 631, each of these holes 631 coupling the faces 63A and 63B to one another. In the exemplary embodiment considered in the figures, the holes 631 are substantially evenly distributed along each of the side edges. Additionally, each of the side edges is provided, on the face 63B of the plate 63, with a rim that is not visible in the figures but that is similar to the rim 432 for the plate 43.

The plate 63 includes two front edges that are opposite one another along the axis X. As visible in FIGS. 2 to 4, one of these front edges is provided with a protuberance 633 that has an apex 633A extending transversely to the axis X. The protuberance 633 also has side faces 633B, which are opposite one another along the axis Y and which extend from the apex 633A diverging from one another toward the opposite front edge. The protuberance 633 thus has, in the plane defined by the axes X and Y, a trapezoidal profile, the base of which is on one of the front edges and the apex 633A of which extends in the direction opposite the opposite front edge, the apex 633A here being parallel to the front edge, the side faces 633B being the sides of the trapezoid. The dimension of the protuberance 633 measured along the axis Y decreases as one comes closer, along the axis X, to the apex 633A from the rest of the protuberance 633.

The protuberance 633 is provided with holes 634 that pass through the plate 43.

The second module 6 further includes an electric component 64, for example an earthing disconnector, shown in FIGS. 2, 3, 5 and 6.

This electrical component 64 includes an arm 641, which is mounted on the face 63A of the plate 63 so as to pivot about an axis Z64 extending along the axis Z. This axis Z64 is orthogonal to the face 63A of the plate 63. The arm 641 can thus rotate on the surface of the plate 63 about the axis Z64.

The second module 6 also includes two stops 642 and 643 that are arranged on the face 63A of the plate 63 so as to limit the amplitude of the rotational movement of the arm 641 about the axis Z64. In the exemplary embodiment considered in the figures, these stops are made in the form of L-shaped metal tabs.

The arm 641 of the electric component 64 is provided with electric contact clamps 644.

The second module 6 further includes a control member 66 that is arranged on the face 63B of the plate 63. This control member 66 is designed to control the electric component 64 in a manner known in itself, in particular to control the pivoting of the arm 641 about the axis Z64. Irrespective of its embodiment, the control member 66 has a dimension along the axis Y that is denoted L66 in FIG. 2.

The switching device 2 also includes rails 81 and 82. Each of these rails 81 and 82 includes a wall 83 that, during use, extends perpendicular to the axis Y. This wall 83 has, on one of its two sides opposite one another along the axis Z, a rim 84, which extends perpendicular to the axis Z and which runs along the wall 83 along the axis X. This rim 84 is provided with through holes 841. The wall 83 is further provided, on its side opposite the rim 84, with a rim 85, which extends perpendicular to the axis Z and which runs along the wall 83 along the axis X. The rims 84 and 85 are for example oriented in the same direction relative to the wall 83. The rim 85 is provided with through holes 851. The two rails 81 and 82 can be individually identical to one another. Reference L83 denotes the distance along the axis Y between the respective walls 83 of the rails 81 and 82.

As shown schematically in FIG. 1, the electric switching device 2 is installed in the high-voltage box 1B of the railway vehicle 1. The switching device 2 is attached to the high-voltage box 1B by means of rails 81 and 82, screws or nuts penetrating the through holes 851 of the rim 85 of the rails 81 and 82 to be anchored to the box 1B. The attachment of the rails 81 and 82 to the high-voltage box 1B can of course assume other embodiments.

Figure 3:
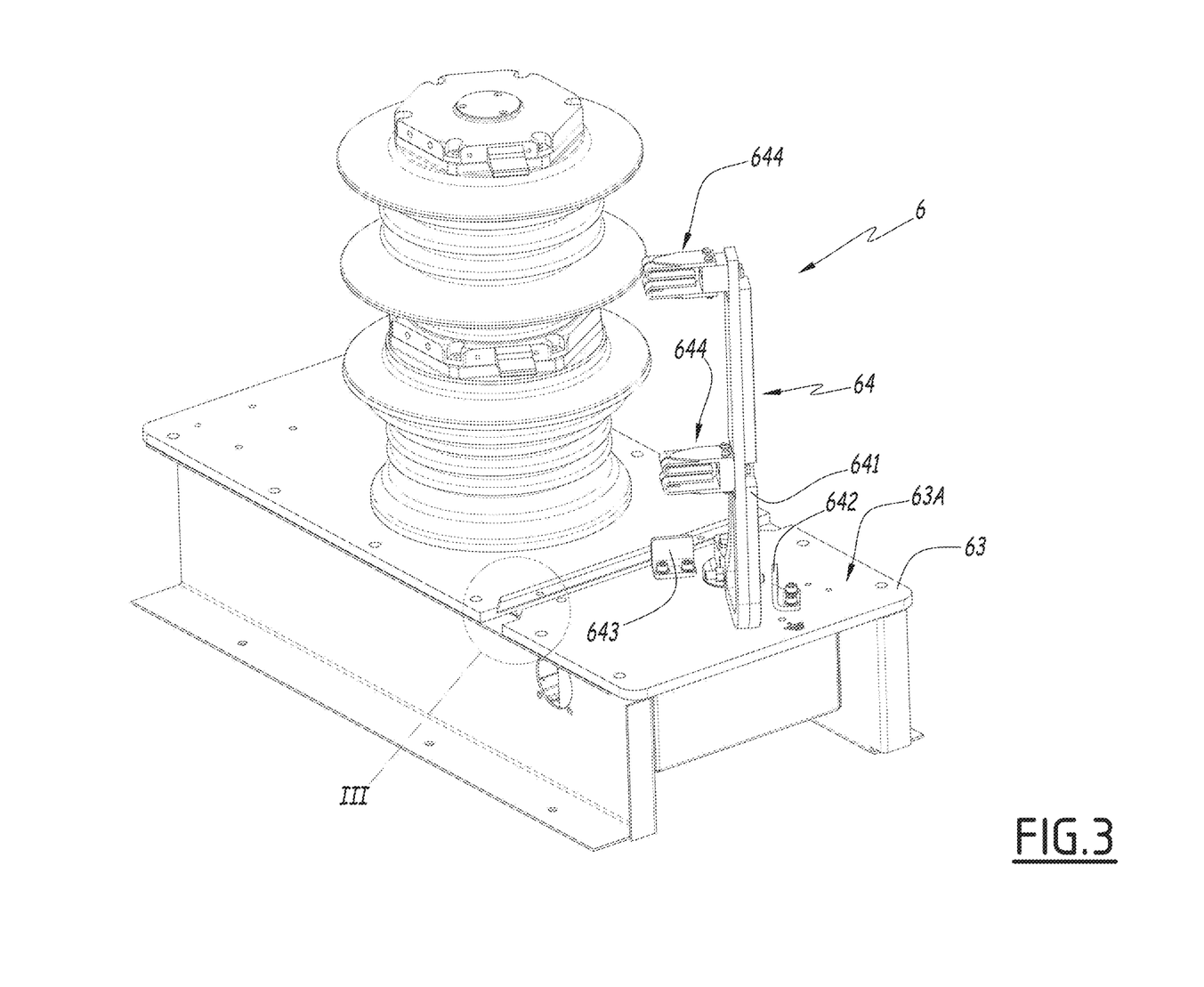
FIG. 3 is a view similar to FIG. 2, illustrating another state of the disassembled configuration.
Figure 4:
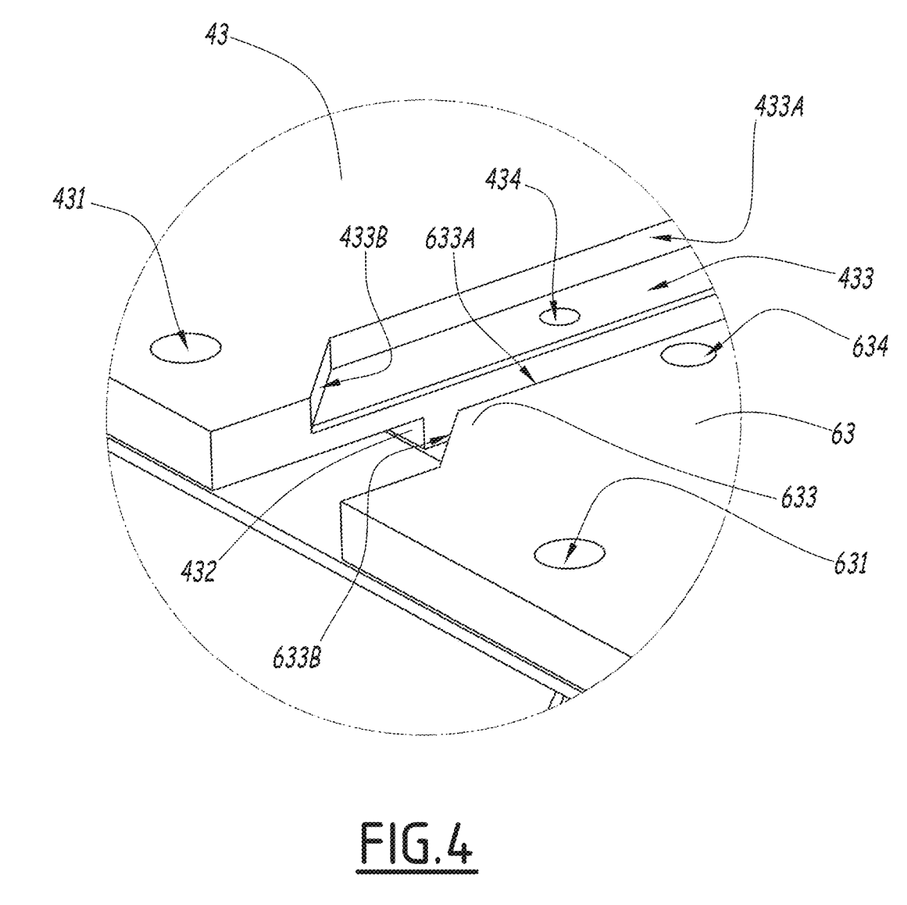
FIG. 4 is a perspective view of detail III of FIG. 3.
Figure 5:
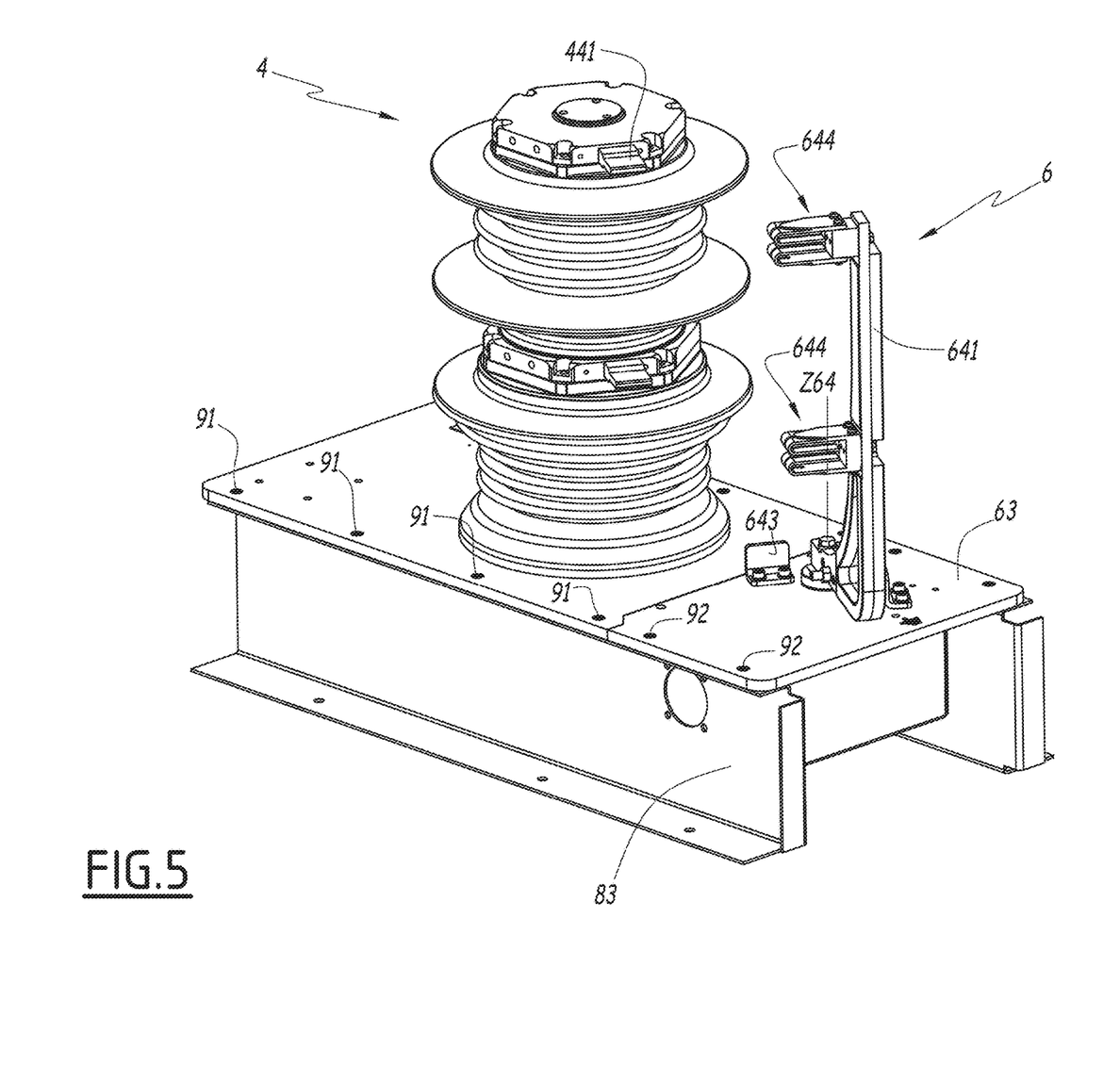
FIG. 5 is a perspective view similar to FIG. 2, showing an assembled configuration.

The rails 81 and 82 make it possible to guide the supports 42 and 62 of the modules 4 and 6 relative to one another between a disassembled configuration, illustrated by FIGS. 2 to 4, and an assembled configuration shown in FIGS. 5 and 6. These two configurations will now be described in detail.

In FIGS. 2 and 3, the first module 4 is engaged on the rails 81 and 82. "Engaged" means that the support 42 is in contact with the rails 81 and 82. More specifically, the face 43B of the plate 43 rests on the rim 84 of the rails 81 and 82, by forming a contact between them that here is a planar surface along the axes X and Y. In practice, the dimension L43 of the plate 43 is provided to be greater than the distance L83 between the rails. According to one advantageous aspect, the distance, along the axis Y, separating the rims 432 is equal to or slightly less than the distance L83 between the respective walls 83 of the rails 81 and 82, such that the rims 432 cooperate by fitting, to within any play, with the wall 83 in order to as block the relative movements of the plate 43 with respect to the rails 81 and 82 along the axis Y. As a result, the first module 4, when it is engaged on the rails 81 and 82, can only be moved along a translation with axis X.

The control member 46 of the first module 4 is located between the walls 83 of the rails 81 and 82, without necessarily touching them, inasmuch as the dimension L46 is smaller than the distance L83.

In FIGS. 2 and 3, the support 62 of the second module 6 is not in contact with the support 42 of the first module 4. In FIG. 3, the module 6 is engaged on the rails 81 and 82, that is to say, the support 62 of the second module is in contact with the rails 81 and 82. In FIG. 2, the module 6 is disengaged from the rails 81 and 82, that is to say, there is no longer any contact between the support 62 and the rails 81 and 82. In the situation of FIG. 3, the module 6 is disengaged, that is to say, it can go from a position engaged on the rails 81 and 82 to a position disengaged from the rails 81 and 82, for example by moving away from the latter through a movement having a component along the axis Z.

FIGS. 2 and 3 therefore illustrate two situations of the disassembled configuration, the first in FIG. 2 in which the first module 4 is engaged and the second module 6 is not engaged on the rails, and the second in FIG. 3 in which the first module 4 and the second module 6 are both engaged on the rails 81 and 82, but without any contact between their respective supports 42 and 62.

The electric component 64 and the circuit breaker 44 are positioned on the same side when the supports 42 and 62 are engaged on the guide means, whether in the disassembled configuration or the assembled configuration. Likewise, the control member 46 and the control member 66 are located on the same side when the supports 42 and 62 are engaged on the guide means 81 and 82.

When the second module 6 is engaged on the rails 81 and 82, the control member 66 is located between the walls 83 of the rails 81 and 82. To that end, the dimension L66 is smaller than the distance L83. The face 63B of the plate 63 bears on the rim 84 of the rails 81 and 82, the dimension L63 of the plate 63 being provided to be greater than the distance L83. Furthermore, according to considerations similar to those relative to the rims 432 for the plate 43, the similar rims provided on the face 63B of the plate 63 are advantageously dimensioned to operate by fitting, to within any play, with the walls 83 in order to block the relative movements of the plate 63 with respect to the rails 81 and 82 along the axis Y. As a result, when the second module 6 is engaged on the rails 81 and 82, the movements are limited to a translation along the direction X.

FIG. 3 thus shows the first module 4 and second module 6 in the disassembled configuration, while the first module 4 and second module 6 are engaged on the rails 81 and 82. The first module 4 and second module 6 can then be translated along the axis X bringing them closer to one another, until a mechanical contact between the support 42 of the first module 4 and the support 62 of the second module 6 is established. The situation shown in FIG. 5 is then reached, illustrating the assembled configuration. In this assembled configuration, the through holes 431 and the through holes 841 are aligned. It is then possible to immobilize the first module 4 on the rails 81 and 82 with fastening means 91, for example using screws or bolts or any other technically acceptable fastening element. In FIGS. 5 and 6, these fastening means 91 are indicated only schematically. Preferably, these fastening means will be reversible, that is to say that the first module 4 or second module 6 will be able to be translated on the rails 81 and 82 in order to return to a disassembled configuration, then disengaged from the rails in order to replace them during maintenance operations. Likewise, in the assembled configuration, the through holes 631 and the through holes 841 are also aligned, making it possible to fasten the support 62 of the second module 6 to the rails 81 and 82 with fastening means 92, which are preferably reversible and similar to the fastening means 91.

When the first module 4 and the second module 6 are brought together in translation to go from the disassembled configuration to the assembled configuration, the side faces of the plates 43 and 63, located across from one another along the axis X, come together until they come into physical contact. In the assembled configuration shown in FIG. 5 and FIG. 6, the protuberance 633 of the plate 63 is inserted into the housing 433 of the plate 43. This insertion of the protuberance 633 into the housing 433 is reversible, by moving the support 42 away from the support 62 along a translation with axis X.

The side faces 433B of the housing 433 and the side faces 633B of the protuberance 633 each have a normal contained in the plane defined by the axes X and Y, these normals being different from one another and different from the axes X and Y. As a result, when the side faces 433B and 633B are in contact in the assembled configuration, the relative positioning of the plates 63 and 43 is determined in the plane defined by the axes X and Y. This positioning is precise, both in terms of spatial positioning and angular positioning. Spatial positioning refers to the relative positioning in the plane comprising the axes X and Y, and angular positioning refers to the rotational positioning about the axis Z. Thus, it will be understood that the protuberance 633 and the housing 433 together form reversible assembly means that make it possible to assemble the supports 42 and 62 to one another reversibly in the assembled configuration. Of course, these assembly means can assume embodiments other than that illustrated in FIGS. 2 to 6. The combined use of the protuberance 633 and the housing 433 having complementary shapes is particularly recommended. These complementary shapes can in particular be a male element and female element pair, the male element penetrating the female element when the first and second supports 62 and 42 go from the disassembled configuration to the assembled configuration.

The hole 434 located in the housing 433 and the through hole 634 located in the protuberance 633 are aligned when the first and second supports 42 and 62 are in the assembled configuration. This allows the use of a means for securing the relative position of the supports 42 and 62, for example a resilient pin or any other reversible immobilizing means, for example as long as the fastening means 91 and 92 are not in place.

It is thus advantageous for the assembly means to be a pair of male and female elements passed through by a hole able to accommodate a securing means: the fine positioning obtained owing to the reversible assembly means will be maintained until the application of the fastening means.

Additionally, in the assembled configuration, the faces 43A of the first support 42 and 63A of the second support 62 are flush. "Flush" means that the faces 43A of the first support 42 and 63A of the second support 62 are globally parallel and located in a same geometric plane.

As shown in FIG. 6, in which the supports 42 and 62 are in the assembled configuration, the electric contact clamps 644 borne by the arm 641 provide an electric connection with the blades 441 of the circuit breaker 44. The electric component 64 of the second module 6 here is an earthing disconnector. In a variant, this electric component 64 can be completed or replaced by another electric component, not shown here, such as a lightning arrester, or any other component able to be associated with the circuit breaker 44.

More generally, the electric component 64 is provided to be electrically connected to the circuit breaker 44, this connection being done when the supports 42 and 62 are in the assembled configuration due to the fact that, in this assembled configuration, the supports 42 and 62 cause the circuit breaker 44 and the component 64 to be able to be connected to one another, in particular by occupying a relative connection position, that is to say, a relative position allowing them to be connected by electric contact. When the first module 4 and second module 6 are in the assembled configuration, the different electric contacts necessary for the proper working of the electric switching device 2 are easily accessible, in order to guarantee, during maintenance operations, an easier connection or disconnection of the electric contacts.

In particular, certain electric connecting or disconnecting operations can be semi-automatic. Semi-automatic means that an operator does not need to intervene physically inside the high-voltage box 1B in which the electric switching device 2 is placed to perform one of these connecting or disconnecting operations between the circuit breaker 44 and the electric component 64, but can perform one of these operations by sending a signal to one and/or the other of the control members 46 and 66. For example, in FIG. 5, the arm 641 of the electric component 64 is in a first position bearing against the stop 642, while in FIG. 6, the arm 641 is in a second position bearing against the stop 643 and the electric contact clamps 644 of the arms 641 are plugged in on the blades 441 of the circuit breaker 44: the electric contact established between the blades 441 and the electric contact clamps 644 is done by pivoting the arms 641 about the axis Z64, this pivoting being controlled by the control member 66. This exemplary semi-automatic electric connection is not limiting, and other connections specific to the actual nature of the electric component 64 can be considered.

The blades 441 of the circuit breaker 44 and the electric contact clamps 644 of the electric component 64 disclosed here are nonlimiting examples of connection members, chosen to guarantee good electric contact and high mechanical robustness, and are preferably made up of male-female electric connection elements.

Likewise, certain electric connection operations between the circuit breaker 44 and the electric component 64, or between the circuit breaker 44 or the electric component 64 and another component (not shown) outside the switching device, can be done manually, before or after the semiautomatic connecting or disconnecting. These manual electric connections are for example done using flanges or collars, fastened by screws or nuts. This list of exemplary manual electric connection means is not limiting.

The electric switching device 2 is in the assembled configuration when the railway vehicle 1 is under normal operating conditions, the first and second modules 4 and 6 then being immobilized by the fastening means 91 and 92. During maintenance operations, an operator can, without physically intervening in the high-voltage box 1B, actuate the required semiautomatic electric connecting or disconnecting means via control members 46 or 66, for example to ground the switching device 2, then intervene directly in the high-voltage box 1B to perform any manual electric connecting or disconnecting operations, and lastly undo the reversible fastening means 91 or 92 of at least one of the first and second modules 4 and 6, undo the securing means passing through the holes 434 and 634 if they are present, separate the first and second modules 4 and 6 from one another by the guide means so that the electric switching device 2 enters the disassembled configuration.

Each of the first and second modules 4 and 6 can then be disengaged from the rails 81 and 82, and can effectively be disengaged from the rails 81 and 82 independently of the other module, that is to say, while leaving the other module engaged on the rails 81 and 82. The disengaged module, although less cumbersome and heavy than the entire switching device 2, can be removed from the high-voltage box 1B, moved into the aisle 10, and removed from the body of the railway vehicle 1 through the existing openings for the operators, without having to use bulky handling means requiring arranging special access through the side wall, or through the roof of the outer body 1A of the railway vehicle 1, or having to disassemble the high-voltage box 1B, as would be required by a switching device with a non-modular structure.

Figure 7:
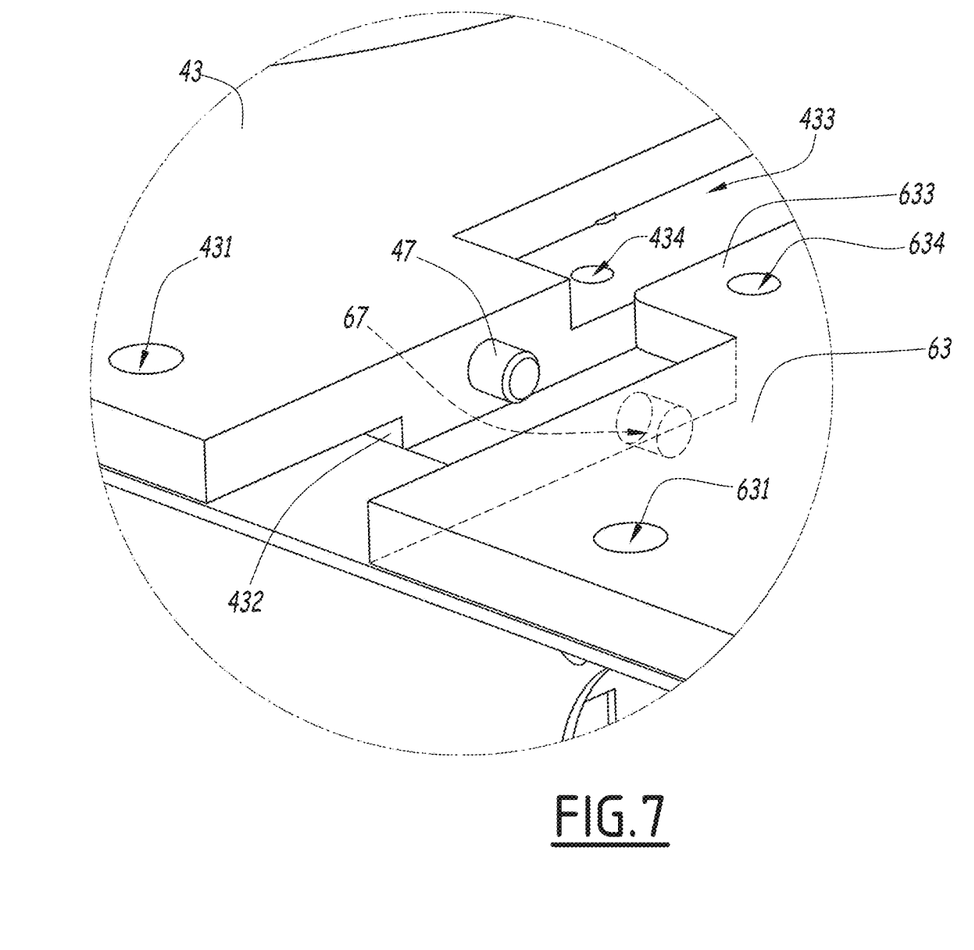
FIG. 7 is a view similar to FIG. 4, illustrating a variant of the switching device.

As a variant, FIG. 7 illustrates another embodiment of the assembly means, namely a housing 433 and a protuberance 633 that are complementary and that have a rectangular cross-section projected in the plane defined by the axes X and Y, combined with a centering pin 47 and a bore 67 that are complementary, for example cylindrical and oriented along the axis X. The combination of the housing 433 and protuberance 633 of rectangular cross-section with the centering pin 47 and the bore 67 is globally easier to produce by machining than the assembly means shown in FIG. 4, having the oblique faces 433B and 633B.

The rails 81 and 82 disclosed thus far are an exemplary embodiment of guide means making it possible to guide the supports 42 and 62 relative to one another between the assembled and disassembled configurations, the guiding resulting therefrom advantageously being able to be in translation along the axis X, like with the rails 81 and 82, but can also be according to other possible kinematics. Thus, systems using guideways, angle irons, or other technical solutions can be considered as alternative or complementary guide means to the rails 81 and 82.

Figure 8:
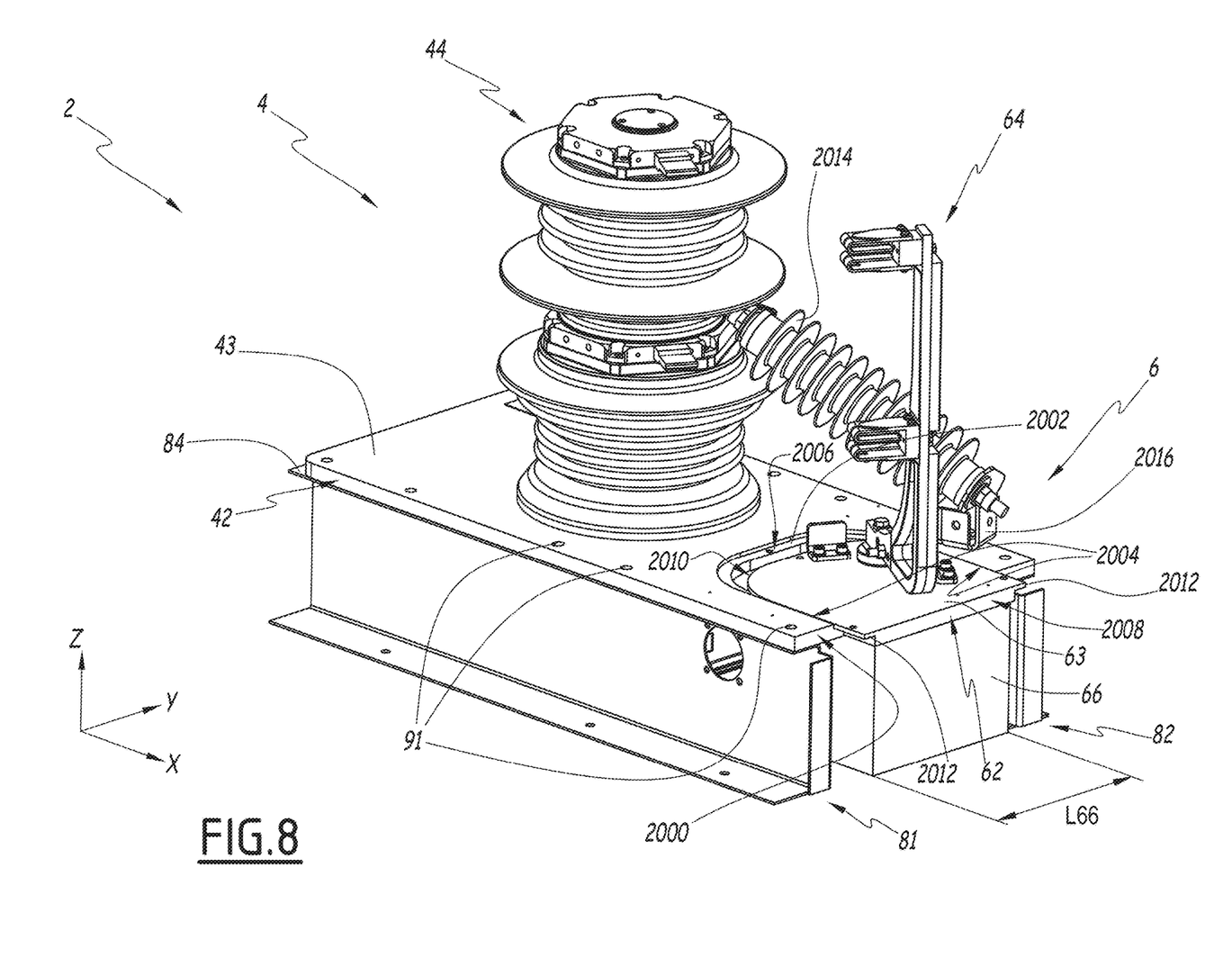
FIG. 8 is a view similar to FIG. 3 of an electric switching device according to a second embodiment of the invention.

A second embodiment is shown in FIG. 8. In the second embodiment, the elements similar to those of the first embodiment bear the same references and work in the same way. Hereinafter, we primarily describe the differences between the first and second embodiments.

In the first embodiment, the guide means are made using the rims 84 of the rails 81 and 82, which cooperate with the complementary shapes arranged on the faces 43B and 63B of the plates 43 and 63. An exemplary embodiment of a complementary shape is the rim 432, visible in FIGS. 4 and 7. In the second embodiment, the guide means are arranged in the first and second supports 42 and 62, in particular in the plates 43 and 63 of the first and second supports 42 and 62.

In the example illustrated in FIG. 8, the plate 43 extends in the direction of the axis X and covers most of the rims 84 of the rails 81 and 82. A cutout with a U-shaped contour, called U-shaped cutout, is arranged along the axis Z through the plate 43, the U-shaped cutout emerging on a front face 2000 of the plate 43, the front face 2000 here being orthogonal to the axis X. The U-shaped cutout has a bottom 2002, coupled by curved surfaces to two side portions 2004. The two side portions 2004 are parallel to one another.

In the illustrated example, the side portions 2004 are parallel to the axis X, while the bottom 2002 is orthogonal to the axis X.

The U-shaped cutout has, on its contour, a profile arranging a housing 2006, with a shape similar to the shape of the housing 433 of the first embodiment. Thus, the housing 2006 comprises portions corresponding to the bottom 2002 and to the lateral side portions 2004.

The plate 63 has a shape complementary to the U-shaped cutout of the plate 43. More specifically, the plate 63 has a face 2008, which is oriented opposite the plate 43, while the plate 63 has, on the side of the plate 43, a complementary contour 2010 with respect to the U-shaped cutout. In particular, the complementary contour 2010 comprises a portion complementary to the bottom 2002, and portions complementary to the side portions 2004.

A protuberance 2012 is arranged along the complementary contour 2010, so as to cooperate with the housing 2006 arranged along the U-shaped cutout. In the example of FIG. 8, the protuberance 2012 has a profile similar to that of the protuberance 633 of the first embodiment.

In the configuration of the device 2 shown in FIG. 8, the second module 6 is supported by the side portions 2004 of the first module 4, more specifically portions of the protuberance 2012 are received in portions of the housing 2006 corresponding to the side portions 2004. The side portions 2004 being parallel to one another, it will be understood that the second module 6 can be translated by an operator relative to the first module 4 along a direction parallel to the axis X, by sliding of the second module 6 on the side portions 2004. The side portions 2004 are thus an exemplary embodiment of guide means arranged in the first and second supports 42 and 62, the housing 2006 and the protuberance 2012 having complementary shapes able to guide the translation of the first and second supports 42 and 62.

From the configuration of FIG. 8, if an operator brings the first and second modules 4 and 6 closer to one another, the complementary contour 2010 comes into contact with the bottom 2002 of the U-shaped cutout, and the first and second supports 42 and 62 are then in the assembled configuration.

It will be understood that as long as the complementary contour 2010 is not in contact with the bottom 2002, but is only in contact with the side portions 2004, the first and second supports 42 and 62 are in the disassembled configuration, the second module 6 being able to be translated, guided by the side portions 2004, or disengaged from the side portions 2004.

The protuberance 2012 cooperates with the portion of the housing 2006 corresponding to the bottom 2002, so as to reversibly assemble the first and second supports 42 and 62 to one another, similarly to how the protuberance 633 and the housing 433 of the first embodiment cooperate. In other words, the housing 2006 and the protuberance 2012 of the second embodiment constitute an exemplary reversible mechanical assembly means of the first support 42 to the second support 62.

Advantageously, in the assembled configuration of the first and second modules 4 and 6, the plate 63 is received in the U-shaped cutout of the plate 43 and the face 2008 of the plate 63 is flush with the front face 2000 of the plate 43.

The U shape, which combines the guide means and assembly means functions, is relatively simple to machine, in particular compared with the shapes of the housing 433 and protuberance 633 of the first embodiment, or rims, similar to the rim 432, arranged on the faces 43B and 63B of the plates 43 and 63.

The plate 43, which extends over the entire length of the rails 81 and 82, is fastened on the entire length of the rails 81 and 82 using fastening means 91, which offers a more rigid assembly than in the first embodiment. In the second embodiment, the second module 62 is not fastened to the rails 81 or 82 like in the first embodiment, but is assembled to the first module 42 owing to the assembly means.

In the second embodiment, the switching means 4 comprises, aside from the circuit breaker 44 and the electric component 64, a third electric component 2014. In the example of FIG. 8, the third component 2014 is part of the first module 4 and couples an intermediate portion of the circuit breaker 44 to a flange 2016 fastened on the face 43A of the plate 43. The third component 2014 is for example an earthing disconnector or a lightning arrester. The component 2016 is not necessary for the second embodiment, but is an illustration of the variety of possible configurations for the modular electric switching device 2, comprising a circuit breaker 44, accompanied by one or several electric components, mounted on the first and/or second modules 4 and/or 6.

According to a variant not shown here, the third electric component 2014 is part of a third module of the electric switching device 2. This third module has a structure according to the invention similar to that of the first and second modules 4 and 6, namely comprising a third support, a third electric component placed on one of the main faces of this third support, and a third control member placed on the other main face of the third support.

The terms first, second and third modules are used to name the modules making up the electric switching device, but do not prejudge the order of engagement of the three modules on the guiding means, or their relative positioning in the assembled configuration.

In the assembled configuration, one of the three modules is located between the other two in an intercalary position; the two side faces along the axis X of the support of this intercalary module are provided with assembly means compatible with the assembly means borne by the supports of the other two modules.

Any feature of one of the embodiments or variants disclosed above can be implemented in the other disclosed embodiments and variants.

The invention claimed is:

1. An electric switching device, embedded in a railway vehicle, comprising:
    a first module including a first support on which a circuit breaker is mounted,
    at least one second module including a second support, which is separate from the first support, and an electric component being mounted on said second support and being configured to be associated with the circuit breaker, and
    a guide, comprising complementary shapes, configured to guide the first and second supports relative to one another between a disassembled configuration, in which at least either one of the first module and the at least one second module is disengageable from the guide independently of each other, and an assembled configuration, in which the circuit breaker and the electric component of said at least one second module are connectable to one another,
    wherein said at least one second module includes a controller, which is configured to control the electric component mounted on the second support of the at least one second module,
    wherein in the assembled configuration, the circuit breaker and the electric component are in a relative connection position and are electrically connectable and disconnectable to one another by action of the controller.

2. The device according to claim 1, wherein the guide is configured to guide in translation, along an axis, the first and second supports between the assembled configuration of the first and second supports and the disassembled configuration of the first and second supports.

3. The device according to claim 2, wherein the guide is arranged in the first and second supports.

4. The device according to claim 1, wherein the first and second supports include a mechanical assembly that is configured to reversibly assemble the first and second supports to one another in the assembled configuration.

5. The device according to claim 4, wherein the assembly comprises a first part borne by the first support and a second part borne by the second support, the first and second parts cooperating by shape complementarity when the first and second supports are in the assembled configuration.

6. The device according to claim 5, wherein one of the first and second parts of the assembly is a male element, wherein another of the first and second parts of the assembly is a female element, and wherein the male element penetrates the female element when the first and second supports go from the disassembled configuration to the assembled configuration.

7. The device according to claim 1, wherein the device includes a fastener configured to fasten the first and second supports reversibly to the guide when the first and second supports are in the assembled configuration.

8. The device according to claim 1, wherein the first support is a plate having a first face on which the circuit breaker is mounted and a second face, which is opposite the first face of the plate of the first support and on which a circuit controller is mounted to control the circuit breaker, wherein the second support is a plate having a first face on which the electric component is mounted and a second face, which is opposite the first face of the plate of the second support and on which the controller is mounted to control the electric component, and wherein the first face of the plate of the first support and the first face of the plate of the second support face a same side when the first and second supports are in the assembled configuration.

9. The device according to claim 8, wherein the first face of the plate of the first support and the first face of the plate of the second support are flush when the first and second supports are in the assembled configuration.

10. The device according to claim 8, wherein the circuit breaker includes a first connector, wherein the electric component includes a second connector, wherein the first and second connectors are electrically connectable to one another when the first and second supports are in the assembled configuration, and wherein the first and second connectors connect to one another under an action of at least either one of the controller and the circuit controller when the first and second supports are in the assembled configuration.

11. The device according to claim 1, wherein the circuit breaker includes a first connector, wherein the electric component includes a second connector, which is controlled by the controller of said electric component, and wherein the first and second connectors are electrically connectable to one another when the first and second supports are in the assembled configuration.

12. The device according to claim 11, wherein:
the guide comprising a pair of rails, and
each rail comprising a rim which cooperate with the complemental shapes arranged on the first and second supports.

13. A railway vehicle, including:
an aisle,
a high-voltage box, accessible via the aisle, and
the electric switching device according to claim 1,
wherein the electric switching device is installed in the high-voltage box when the first and second supports are in the assembled configuration, at least one of the first and second modules of the device being dimensioned to be moved in the aisle when the first and second supports are in the disassembled configuration.

* * * * *